(No Model.)
N. B. LE FEVRE.
BICYCLE STAND.
No. 542,964. Patented July 16, 1895.
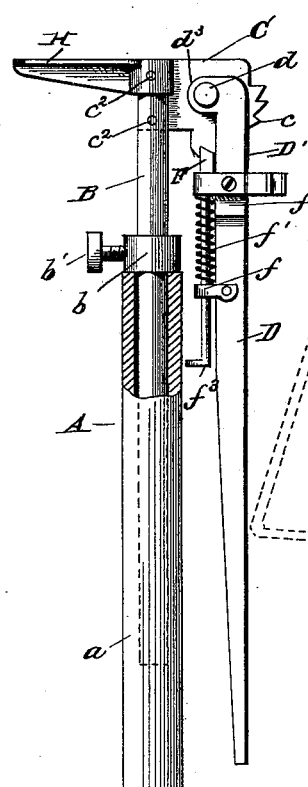
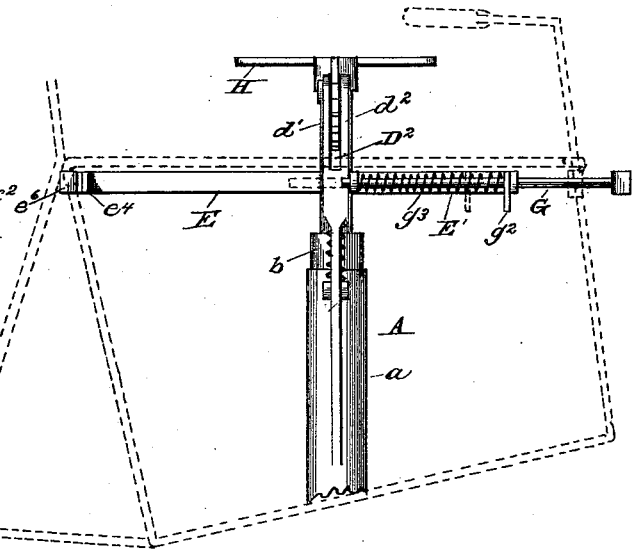
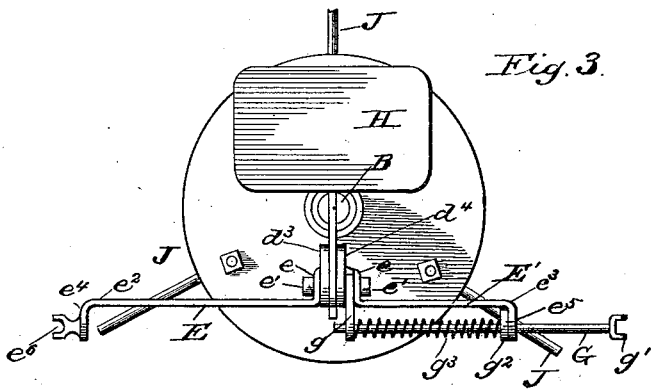
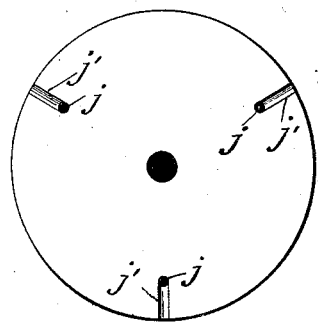
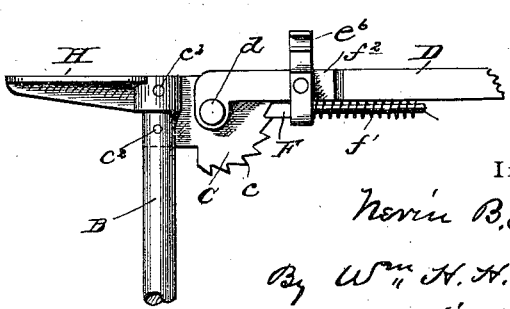
Witnesses:
H. S. Knight.
G. M. Knight.
Inventor.
Nevin B. Le Fevre.
By Wm. H. H. Knight
His Attorney.

UNITED STATES PATENT OFFICE.

NEVIN BUFFINGTON LE FEVRE, OF LITTLESTOWN, PENNSYLVANIA.

BICYCLE-STAND.

SPECIFICATION forming part of Letters Patent No. 542,964, dated July 16, 1895.

Application filed November 26, 1894. Serial No. 529,950. (No model.)

*To all whom it may concern:*

Be it known that I, NEVIN BUFFINGTON LE FEVRE, a citizen of the United States, residing at Littlestown, in the county of Adams and State of Pennsylvania, have invented certain new and useful Improvements in Bicycle-Stands; and I do hereby declare the following to be a full, clear, and exact description of the invention, such as will enable others skilled in the art to which it appertains to make and use the same.

My invention relates to the class of bicycle-stands, and has for its object the provision in a device of the class named of means for raising and lowering the bicycle-holding mechanism or clamps at will for maintaining such bicycle in either the vertical or horizontal plane, as desired, of means whereby tools, &c., may be kept in convenient proximity to one using the stand when repairing bicycles, and finally for the arrangement and combination of the several parts of the device for service, substantially as is hereinafter set forth and illustrated in the accompanying drawings, wherein—

Figure 1 is a side elevation, partly in section, of my improved bicycle-stand. Fig. 2 is a front elevation of the upper part of the stand and its connected clamp and shows in dotted lines a bicycle-frame upon said clamp. Fig. 3 is a top plan view. Fig. 4 is an elevation of the upper portion of the stand and shows the clamp-carrying arm or lever in a horizontal position, and Fig. 5 is a bottom plan view of the stand.

As hereinbefore stated the present invention contemplates a bicycle-stand which may be employed either for the purpose of supporting the bicycle in an upright position when the same is not in use or in horizontal position when necessary to repair such bicycle or at any angle between such upright and horizontal positions for the purpose of raising the wheels from contact with the floor or ground when oiling such bicycle, and such being the functions of the device it will readily commend itself to those accustomed to the use of bicycles as an exceedingly-useful implement. To further this impression and at the same time to add, if possible, to the utility of the device, I have provided simple and easily-operated means for raising and lowering the bicycle while the same is fast upon the stand, and also for holding tools, &c., in close proximity to those repairing such bicycle.

Referring to the drawings, wherein similar letters of reference denote similar parts, A designates a tubular standard, of iron or other suitable material, the bottom $a$ of which is preferably flared outward, as shown, for the purpose of maintaining said standard in a vertical position.

B designates a shaft that moves freely within the tubular standard A, and is held at any desired height therein by a collar $b$, which encircles the shaft B and rests upon the top of the standard. A set-screw $b'$ secures the collar at any desired point of the shaft B.

To the top of the shaft B, I secure a plate C, the outer free end of which I provide with a series of teeth or detents $c$, which are concentric with a pivotal pin $d$, as shown.

The plate C may be secured in any desired manner to the shaft B, but I preferably secure it to said shaft in the manner shown, viz., by slotting the upper end of said shaft and securing the plate within such slot by pins or rivets $c^2$. (See Figs. 1 and 3.)

D designates an arm or lever, the upper end D' of which I preferably thicken and provide with a slot $D^2$, into which the plate C extends when the arm is pivoted to said plate, as shown. I provide each of the parts $d'$ $d^2$, which are formed by the slot $D^2$ on the arm D at their extreme ends, with rearwardly-projecting portions $d^3$ $d^4$ and aperture said portions to receive a pivotal pin $d$, whereby the arm D is hinged to the plate C. (See Fig. 1.)

E E' designate arms that project laterally from the swinging arm or lever D near its upper end to support a bicycle. I preferably form the arms E E' of a single bar bent at $e$ rearwardly to form a loop, which embraces the swinging arm or lever D and also forms a guide for a spring-pressed latch-bar F, presently to be described. The arms E E' are secured to the lever or arm D by screws or bolts $e'$, that extend through the sides of the loop $e$ and into the arm D, as shown.

I provide the outer free ends $e^2$ $e^3$ of the arms E E' with forwardly-bent portions $e^4$ $e^5$, the former $e^4$ of which I provide with a stirrup-block $e^6$ to engage and hold one side of the bicycle-frame, while the latter $e^5$ is apertured to receive a rod G, that is held parallel to the arm $e'$ by said projection $e^5$, and an apertured guide or lug $g$, secured to the lever D within the loop $e$. I provide the outer free end of the rod G with a stirrup $g'$ to hold the remaining side of the bicycle-frame upon said rod at or near its middle. I secure a depending lug or thumb-piece $g^2$, by which the rod may be moved against the pressure of a spring $g^3$, that is placed upon the rod between the thumb-piece $g^2$ and lug $g$, and operates to keep said rod G normally projected.

I provide the arm or lever D, upon its under side, with a latch-bar F, that is mounted at one end in a guide formed by the loop $e$ and at its opposite end in a guide-lug $f$, projecting from said lever. I preferably form the inner portion of the latch-bar square in cross-section and bevel its inner end to engage the teeth $c$ of the plate C. A spring $f'$ upon the bar between the shoulder $f^2$, formed by the squared part thereof, and the guide-lug $f$ operate to keep the latch-bar in close contact with the teeth $c$. I provide the outer end of the bar with a thumb-piece $f^3$, for the purpose of releasing the bar from contact with the teeth when desired.

H designates a shelf or table that is secured to the upper end of the shaft B to receive tools, &c.

To further insure the stability of the stand, I provide the base $a$ with a series of apertures $j$ to receive the inner ends of radially-disposed legs J. I provide the lower surface of the base $a$ with recesses or grooves $j'$, that extend from the apertures $j$ outwardly to the periphery of said base to receive the legs J. If desired, the legs J may be dispensed with and screws or bolts used in lieu thereof to secure the stand to a floor.

In operation the bicycle-frame is placed upon the stirrups $e^6$ $g'$ of the arm G, the spring $g^3$ yielding to accommodate different lengths of frames, as shown in Fig. 2, in which the bicycle-frame is shown in upright position, the lower brace or bar of the bicycle resting against the swinging arm or lever D. When desired, the arm D may be swung outward and upward into the position shown in Fig. 4 and be held in such position by the engagement of the latch-bar F with the teeth $c$ of the plate C, or any intermediate point between such upright and horizontal positions may be used as the position of the arm, as may be readily understood.

Having thus described my invention, I claim and desire to secure by Letters Patent—

1. In a bicycle stand, a standard, an arm or lever hinged to said standard, and a cross arm connected to said hinged arm, or lever, and stirrups connected to said cross arm to hold a bicycle frame, substantially as described.

2. In a bicycle stand, a standard, a swinging arm or lever hinged to said standard, a cross arm, connected to said swinging arm, or lever, a sliding spring pressed bar, connected to said cross arm, and stirrups to hold a bicycle frame, substantially as described.

3. In a bicycle stand, a tubular standard, a shaft within said standard, a plate connected to said shaft, and detents upon said plate, in combination with a swinging arm, or lever, a latch bar connected to lock said swinging arm or lever in elevated position, a cross arm on said swinging arm, or lever, a spring pressed rod on said cross arm, and stirrups to hold a bicycle frame, substantially as described.

4. In a bicycle stand, a tubular standard, a shaft within said standard, a shelf connected to said shaft to hold tools, &c., an arm, or lever hinged to said shaft, a cross arm connected to said hinged arm or lever, and stirrups connected to said cross arm substantially as described.

In testimony whereof I have affixed my signature in presence of two witnesses.

NEVIN BUFFINGTON LE FEVRE.

Witnesses:
J. CALVIN REBERT,
HARRY KOHLER.